(12) United States Patent
Malone et al.

(10) Patent No.: US 10,047,627 B2
(45) Date of Patent: Aug. 14, 2018

(54) METHODS AND SYSTEM FOR A TURBOCHARGER

(71) Applicant: General Electric Company, Schenectady, NY (US)

(72) Inventors: Matthew John Malone, Boulder, CO (US); Daniel Edward Loringer, Erie, PA (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 15/157,510

(22) Filed: May 18, 2016

(65) Prior Publication Data

US 2016/0369645 A1 Dec. 22, 2016

Related U.S. Application Data (60) Provisional application No. 62/174,000, filed on Jun. 11, 2015.

(51) Int. Cl.
| | | |
|---|---|---|
| *F01D 11/24* | (2006.01) | |
| *F02B 37/00* | (2006.01) | |
| *F02B 29/04* | (2006.01) | |
| *F02B 39/00* | (2006.01) | |
| *F02B 33/40* | (2006.01) | |

(52) U.S. Cl.
CPC .............. *F01D 11/24* (2013.01); *F02B 29/04* (2013.01); *F02B 33/40* (2013.01); *F02B 37/00* (2013.01); *F02B 39/005* (2013.01); *F05D 2220/40* (2013.01); *F05D 2260/20* (2013.01); *Y02T 10/144* (2013.01); *Y02T 10/146* (2013.01)

(58) Field of Classification Search
CPC .......... F01D 11/24; F02B 37/00; F02B 29/04; F02B 33/40; F02B 39/005; Y02T 10/144; Y02T 10/146; F05D 2260/20; F05D 2220/40
USPC ..... 60/605.1, 605.2, 646, 657; 415/115–117, 415/178
See application file for complete search history.

(56) References Cited

U.S. PATENT DOCUMENTS

| | | | |
|---|---|---|---|
| 4,928,637 A | 5/1990 | Naitoh et al. | |
| 4,999,991 A | 3/1991 | Haddad et al. | |
| 5,779,436 A | 7/1998 | Glezer et al. | |
| 7,966,868 B1 * | 6/2011 | Sonnichsen | F01D 25/285 73/112.01 |
| 9,534,503 B2 * | 1/2017 | Isogai | F01D 5/20 |
| 9,567,942 B1 * | 2/2017 | Krivitzky | F02K 1/36 |

(Continued)

FOREIGN PATENT DOCUMENTS

JP  1077804 A  3/1998

OTHER PUBLICATIONS

PCT Search Report and Written Opinion issued in connection with corresponding PCT Application No. PCT/US2016/036559 dated Aug. 24, 2016.

*Primary Examiner* — Hoang Nguyen
(74) *Attorney, Agent, or Firm* — GE Global Patent Operation; John A. Kramer (57) ABSTRACT

Various methods and systems are provided for controlling a tip clearance between a shroud and blade of a turbocharger turbine. In one embodiment, a method for an engine including a turbocharger comprises, selectively adjusting a flow of coolant from one or more engine coolant sources through a shroud of a turbine based on a tip clearance between the shroud and a blade of the turbine.

20 Claims, 6 Drawing Sheets

(56) References Cited

U.S. PATENT DOCUMENTS

| | | |
|---|---|---|
| 2005/0126181 A1 | 6/2005 | Wilson et al. |
| 2012/0114464 A1 | 5/2012 | Robinson et al. |
| 2013/0004291 A1* | 1/2013 | Williams ................ F01D 25/16 |
| | | 415/1 |
| 2013/0266428 A1 | 10/2013 | Panambur et al. |
| 2015/0322850 A1* | 11/2015 | Vardhana .............. F01D 25/166 |
| | | 415/177 |

* cited by examiner

METHODS AND SYSTEM FOR A TURBOCHARGER

CROSS-REFERENCE TO RELATED APPLICATIONS

This application claims priority to U.S. Provisional Patent Application No. 62/174,000, entitled, "METHOD AND SYSTEMS FOR CONTROLLING A TURBINE BLADE TIP CLEARANCE OF A TURBOCHARGER," filed Jun. 11, 2015, which is hereby incorporated in its entirety by reference for all purposes.

BACKGROUND

Technical Field

Embodiments of the subject matter disclosed herein relate to turbochargers. Other embodiments relate to tip clearance of a turbocharger turbine.

Discussion of Art

Turbochargers may be used in an engine system to increase a pressure of air supplied to the engine for combustion. In one example, the turbocharger includes a turbine, coupled in an exhaust passage of the engine, which at least partially drives a compressor via a shaft to increase the intake air pressure. Exhaust gas passing through the turbine rotates the blades of a turbine disc mechanically coupled to a compressor wheel through the shaft. The performance of the turbine disc assembly may be achieved by a turbine blade tip clearance between the rotating turbine blade and a stationary turbine shroud. The tip clearance may be set during manufacturing to provide a desired turbine disc performance, such as a maximum turbine RPM, pressure drop, or the like.

Turbine blade tip growth, as well as turbine shroud geometry changes, may occur during turbocharger operation and result in varying tip clearance between the turbine blade and shroud. As tip clearance increases, turbine efficiency may decrease. Tip contact between the turbine blade and shroud may result in degradation of the associated turbocharger components. It may be desirable to have a system and method that differs from those that are currently available.

BRIEF DESCRIPTION

In one embodiment, in an engine including a turbocharger, a flow of coolant may be selectively adjusted from one or more engine coolant sources through a turbine shroud of a turbine based on a tip clearance between the turbine shroud and a turbine blade of the turbine.

DETAILED DESCRIPTION

The following description relates to a turbocharger, a turbocharger system, and associated methods. Some embodiments relate to a tip clearance between a turbine shroud of a turbocharger turbine and a turbine blade of the turbocharger turbine. An associated method may selectively adjust a flow of coolant from one or more engine air sources through a turbine shroud of a turbine based on a tip clearance between the turbine shroud and a turbine blade of the turbine.

In one example, the turbine shroud may include an internal cooling path for flowing coolant and adjusting a temperature of the turbine shroud. The coolant may be provided from a variety of engine sources, such as air from downstream of a turbocharger compressor, air from downstream of a charge air cooler, and/or air from an additional compressor on board a vehicle in which the turbocharger is installed. In another example, the coolant may be provided from a liquid coolant source such as engine coolant.

Some suitable engine systems may be stationary, while others may be on semi-mobile or mobile platforms. Semi-mobile platforms may be relocated between operational periods. Suitable mobile systems may be mounted on flatbed trailers. Other suitable mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
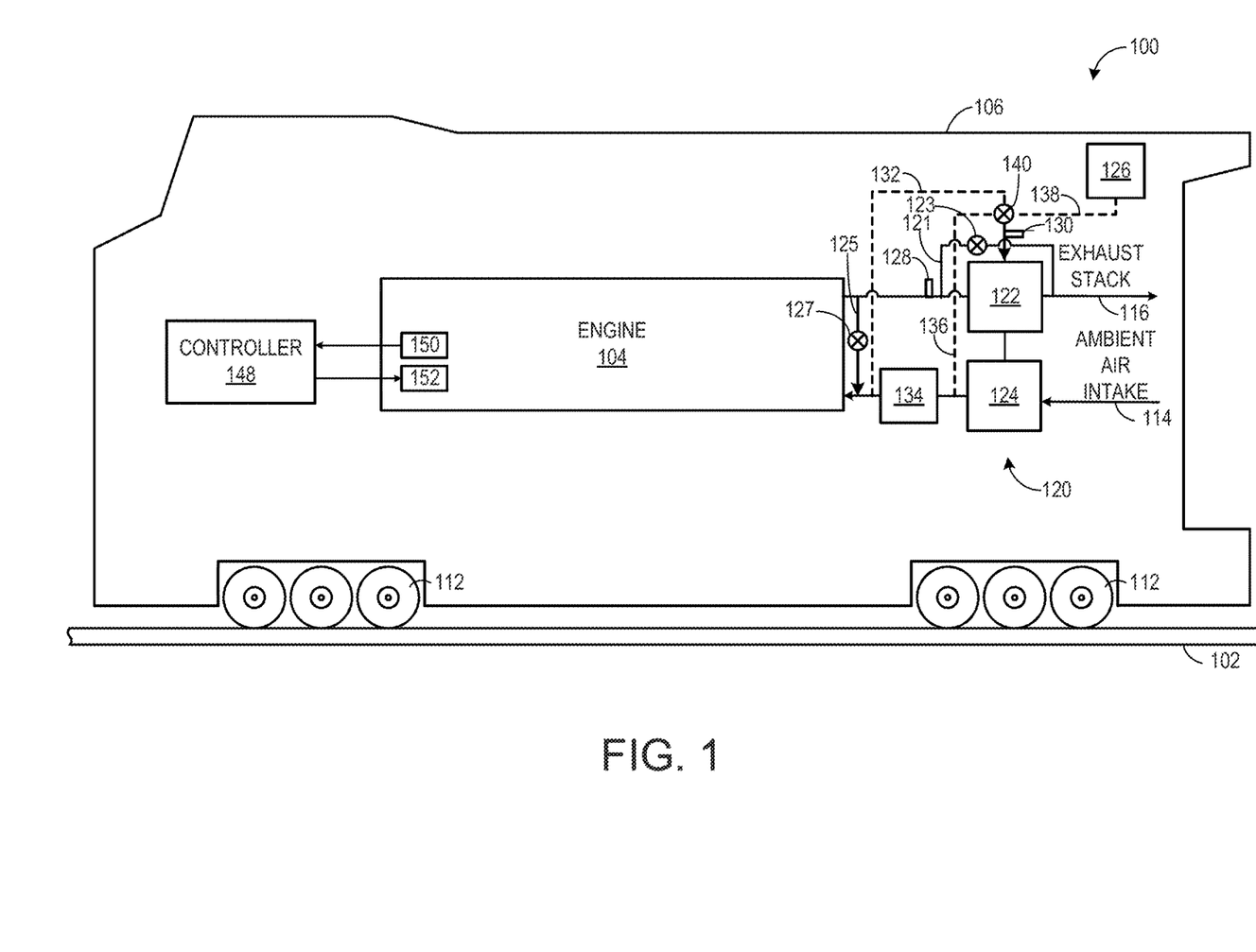
FIG. 1 shows a schematic diagram of a vehicle with a turbocharger according to an embodiment of the disclosure.
Figure 2:
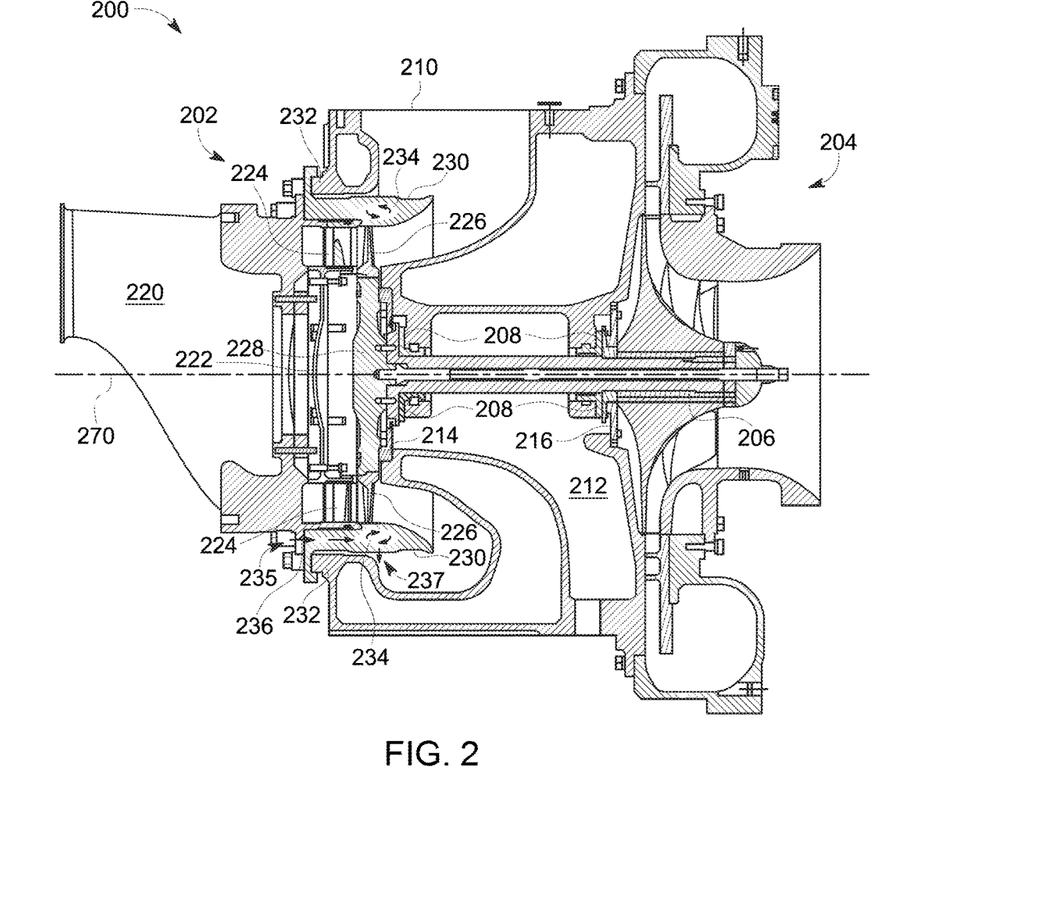
FIG. 2 shows a cross-sectional view of a turbocharger according to an embodiment of the invention.
Figure 3:
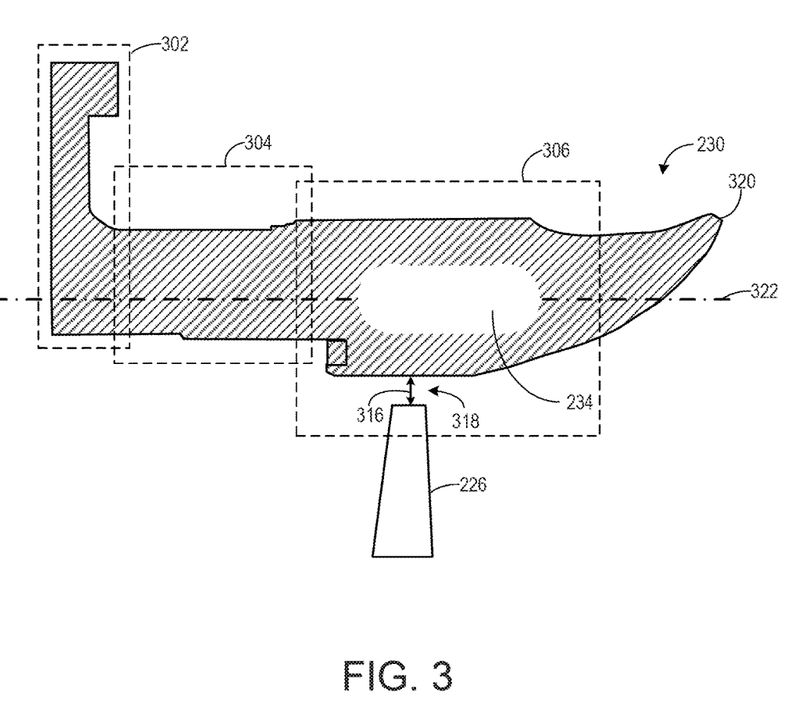
FIG. 3 shows a cross-sectional view of a turbine shroud according to an embodiment of the invention.

Aspects of the invention are disclosed with reference to the turbocharger shown in FIGS. 1-2. The turbocharger casing may include a turbine casing and a compressor casing, where the turbine casing includes a turbine shroud surrounding a turbine disc of the turbine. The turbine disc includes a plurality of turbine blades. FIG. 3 shows an embodiment of a turbine shroud including an internal cooling path for flowing coolant from one or more sources. Suitable coolants include fluids that are liquid or gas. Suitable liquid coolants include water, lubricant oils, and the like. Suitable gas includes air. The coolant air may be supplied by compressors, pumps, reservoir tanks, and other like sources.

Figure 4:
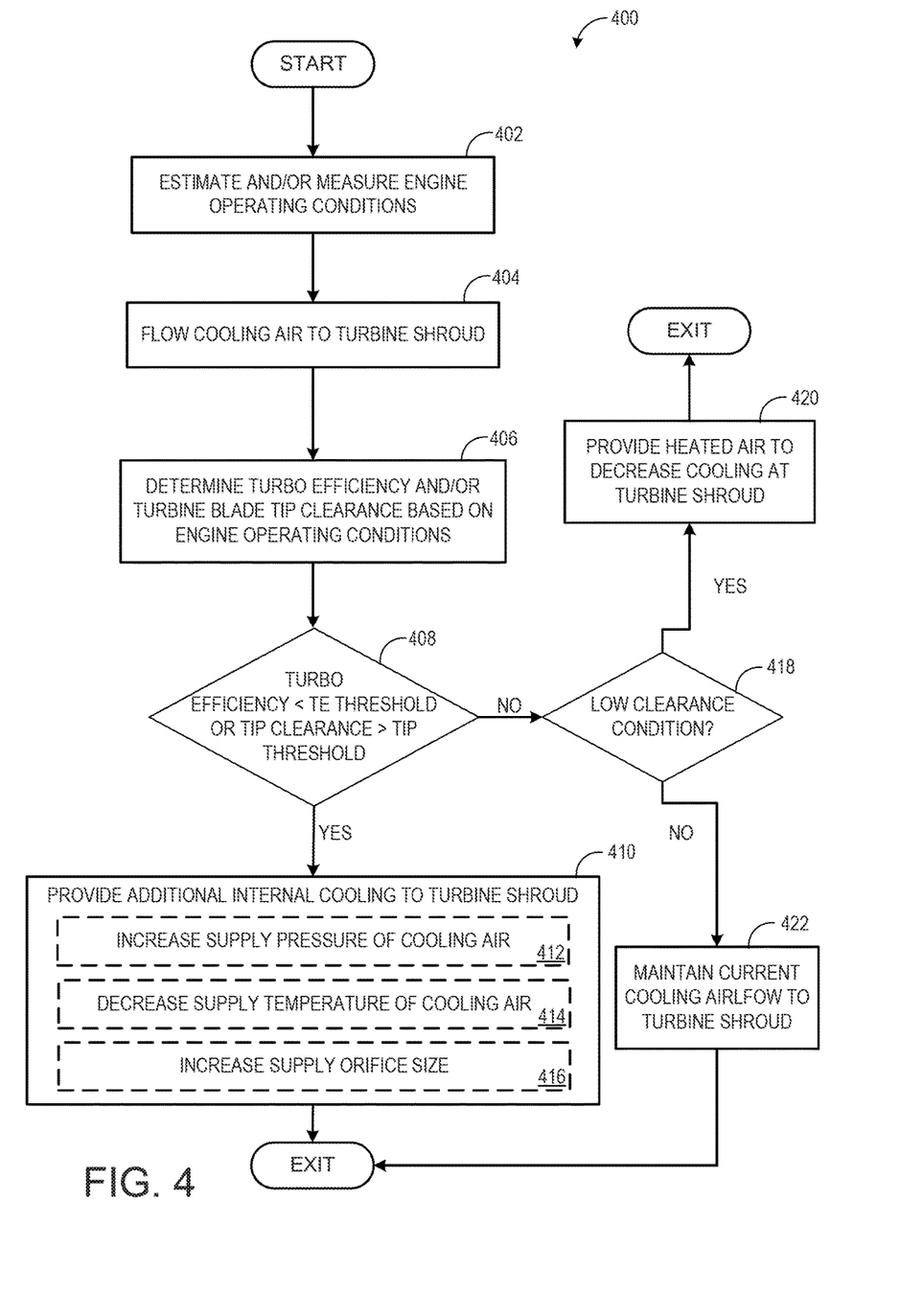
FIG. 4 shows a method for adjusting cooling of a turbine shroud based on a turbine blade tip clearance according to an embodiment of the invention.

During engine operation, a tip clearance between the turbine shroud and turbine blade may change, thereby changing the efficiency of the turbocharger. FIG. 4 presents an embodiment of a method for adjusting the flow of coolant through the internal cooling path of the shroud based on the tip clearance. As a result, tip clearance may be controlled to a desired amount during a range of engine operating conditions, thereby reducing turbocharger degradation and increasing engine efficiency.

Before further discussion of the approach for controlling a turbocharger turbine tip clearance, a positioning of a turbocharger in an engine system is shown. FIG. 1 shows a block diagram of an embodiment of a vehicle system 100 (e.g., a locomotive system), herein depicted as vehicle 106. The illustrated vehicle is a rail vehicle configured to run on a rail 102 via a plurality of wheels 112. As depicted, the vehicle includes an engine system with an engine 104.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system includes a turbocharger 120 ("TURBO") that is arranged between the intake passage and the exhaust passage. The turbocharger increases air charge of ambient air drawn into the intake passage in order to provide greater charge density during combustion to increase power output and/or engine-operating efficiency. The turbocharger includes a compressor 124 which is at least partially driven by a turbine 122. While in this case a single turbocharger is shown, other systems may include multiple turbine and/or compressor stages. The turbocharger is described in greater detail below with reference to FIG. 2. The turbine may include a turbine bypass passage 121 disposed around the turbine and configured to divert exhaust gas around the turbine (from upstream of the turbine to downstream of the turbine in the exhaust passage). The turbine bypass passage includes a wastegate valve (e.g., turbine bypass valve) 123 actuatable via a controller 148 to adjust an amount of opening of the wastegate and thus the amount of exhaust gas flow through the turbine bypass passage.

As shown in FIG. 1, the vehicle also includes a high pressure exhaust gas recirculation (HP EGR) passage 125. The HP EGR passage diverts exhaust gas from the exhaust passage, upstream of the turbine, to the intake passage, downstream of the compressor. The HP EGR passage includes an EGR valve 127 adjustable via the controller 148 to control an amount of exhaust gas recirculating through the HP EGR passage.

A charge air cooler 134 is disposed in the intake passage, downstream of the compressor. As such, the charge air cooler is adapted to cool the charge air leaving the compressor, before it enters engine cylinders of the engine. The charge air cooler may maintain a temperature of the charge air at a desired temperature based on engine operating conditions.

The vehicle includes an additional vehicle compressor 126. As one example, the vehicle compressor is an on-board locomotive (e.g., vehicle) compressor located on board the rail vehicle. In one example, a temperature of the air exiting the vehicle compressor may be maintained relatively constant and air may always be flowing out of the vehicle compressor.

A casing of the turbine includes a shroud (as shown in FIGS. 2-3 and described in further detail below) surrounding a turbine disc of the turbine. The shroud may include an internal cooling (e.g., coolant) pathway for flowing a fluid (as described further below with reference to FIGS. 2-4), such as liquid coolant, air, or another type of fluid. As one example, the fluid (e.g., coolant) provided to and flowing through the internal cooling pathway of the shroud may be air from one or more engine or vehicle air sources. In one embodiment, charge air from downstream of the compressor (e.g., turbocharger compressor) and upstream of the charge air cooler is routed via a first coolant path 136 to the internal cooling pathway of the turbine shroud. In another embodiment, charge air from downstream of the charge air cooler and upstream of at least an engine cylinder of the engine is routed via a second coolant path 132 to the internal cooling pathway of the turbine shroud. In yet another embodiment, air output from the vehicle compressor is routed via a third coolant path 138 to the internal cooling pathway of the turbine shroud. An embodiment of an internal cooling pathway of the turbine shroud is shown in FIGS. 2 and 3, described further below.

In one embodiment, only one of the three coolant paths described above may be coupled to the internal cooling pathway of the turbine shroud, such that air is only provided from a single engine or vehicle air source. However, in another embodiment, two or more of the three coolant paths may be coupled to the internal cooling pathway of the turbine shroud. In this embodiment, a coolant valve 140 is provided upstream of the internal cooling pathway of the turbine shroud. Two or more of the first coolant path, second coolant path, and third coolant path may be coupled to the coolant valve. A position of the valve dictates which of the air flows are provided to the internal cooling pathway of the turbine shroud. For example, the valve may be adjusted into a first position that allows flow of air from only the first coolant path and not the other coolant paths through the coolant valve and to the shroud. In another example, the valve may be adjusted into a second position that allows flow of air from only the second coolant path and not the other coolant paths through the coolant valve and to the shroud. In yet another example, the valve may be adjusted into a third position that allows flow of air from only the third coolant path and not the other coolant paths through the coolant valve and to the shroud. As such, a position of the valve selectively controls which engine or vehicle air source provides air to the turbine shroud. Further, since the different air sources have different air temperatures, the temperature of air flowing through the internal cooling pathway of the shroud may be controlled based on the position of the coolant valve. For example, the air from downstream of the compressor and upstream of the charge air cooler may be hotter than air from downstream of the charge air cooler. In this way, cooler or hotter charge air may be provided to the turbine shroud. In another embodiment, each of the first, second, and third coolant paths may include their own coolant valve instead of the single coolant valve upstream of the shroud.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

The controller 148 (e.g., electronic controller) may be employed to control various components related to the vehicle system. In one example, the controller includes a computer control system (e.g., one or more processors). The controller further includes computer readable storage media (not shown) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. The controller may also receive a signal of a temperature of air entering the turbine from a first temperature sensor 128 disposed upstream of the turbine and a signal of an air temperature of air entering the internal cooling pathway of the turbine shroud from a second temperature sensor 130 disposed upstream of the internal cooling pathway of the turbine shroud (and downstream of the coolant valve). Correspondingly, the controller may control aspects and operations of the vehicle system by sending commands to various components such as traction motors, alternator, cylinder valves, throttle, coolant valves, and the like. Thus, the controller receives signals from the various sensors of FIG. 1 and employs the various actuators of FIG. 1 to adjust engine operation based on the received signals and instructions stored on a memory of the controller.

FIG. 2 shows a cross-section of an exemplary embodiment of a turbocharger 200 that may be coupled to an engine, such as the turbocharger described above with reference to FIG. 1. In one example, the turbocharger may be bolted to the engine. In another example, the turbocharger may be coupled between the exhaust passage and the intake passage of the engine.

The turbocharger includes a turbine 202 and a compressor 204. Exhaust gases from the engine pass through the turbine, and energy from the exhaust gases is converted into rotational kinetic energy to rotate a shaft 206 which, in turn, drives the compressor. Ambient intake air is compressed (e.g., pressure of the air is increased) as it is drawn through the rotating compressor such that a greater mass of air may be delivered to the cylinders of the engine.

The turbocharger has a casing 210. In other embodiments, the turbine and the compressor may have separate casings which are bolted together, for example, such that a single unit (e.g., turbocharger 200) is formed. As an example, the turbocharger may have a casing made of cast iron and the compressor may have a casing made of an aluminum alloy. In such an instance, the different coefficients of thermal expansion of these disparate materials may be relatively large. In another example, the entire turbocharger casing may be made of cast iron, including the compressor casing.

The turbocharger further includes bearings 208 to support the shaft, such that the shaft may rotate at a high speed with relatively reduced friction. As depicted in FIG. 2, the turbocharger includes two non-contact seals (e.g., labyrinth seals), a turbine labyrinth seal 214 positioned between an oil cavity 212 and the turbine and a compressor labyrinth seal 216 positioned between the oil cavity and the compressor. In other embodiments, the turbocharger may include alternative or additional seals. Seal selection may be made with reference to application specific parameters.

Over a duration of turbocharger use the bearings may begin to wear. As a result, bearing material worn away from the bearings may collect within the oil cavity and/or in an oil return channel fluidly coupled with the oil cavity. An amount of degradation or wear of the turbocharger bearings may be determined based on the amount of collected bearing debris. However, if the bearing wear collection is internal to the turbocharger casing, a user may not visualize the amount of collected bearing debris and thus the state of the bearings may not be determined. As one example, the turbocharger shown in FIG. 2 may include one or more inspection ports for collecting the bearing debris from the oil cavity and oil return channel. The inspection port may include one or more of a viewing window for visual inspection via a user or a sample port for taking an oil sample and then inspecting the collected oil sample for bearing debris.

Figure 5:
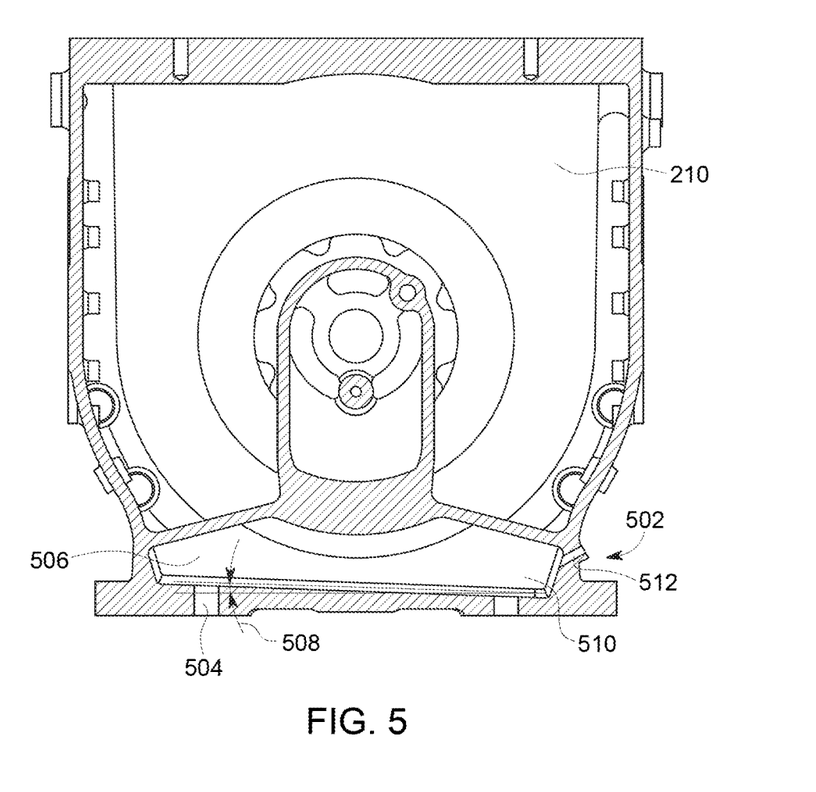
FIGS. 5-6 show an inspection port for a turbocharger according to an embodiment of the invention.
Figure 6:
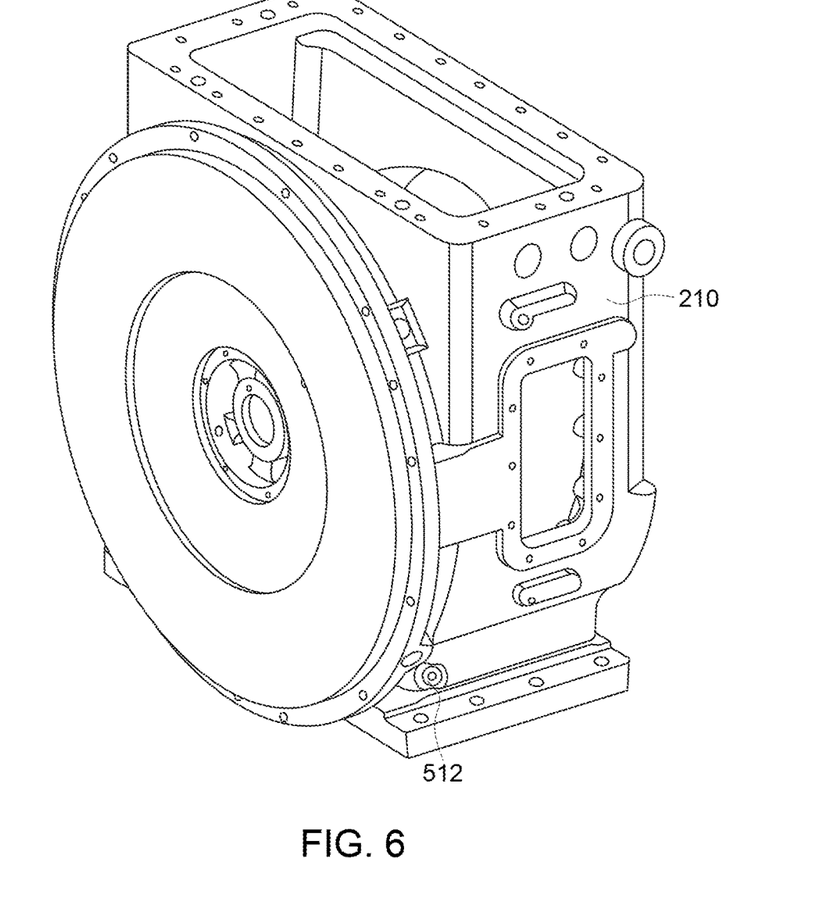

FIGS. 5-6 show an example of an inspection port 502 for a turbocharger, such as the turbocharger of FIG. 2. As shown in FIG. 5, the inspection port may be included in the casing of the turbocharger and fluidly coupled to the oil return channel 504 (which may be part of or coupled to an oil cavity, such as oil cavity 212 shown in FIG. 2). For example, the inspection port may be included at the turbocharger oil return channel (e.g., drain) and may include a cavity 506 with a lip such that oil overflows the lip but the bearing debris collects in a bottom portion 510 of the cavity. The oil cavity and/or oil drain may additionally or alternatively include a funnel that funnels the bearing debris to an inspection port within the turbocharger casing. For example, as shown in FIG. 5, the cavity may have an angled bottom, as shown by angle 508, to direct debris to one section of the cavity. As yet another example, an inspection port within the turbocharger casing may include a magnet for magnetically attracting the metallic bearing debris from the oil drain. As also shown in FIG. 5, the oil drain may be routed to a side of the turbocharger casing so that collected debris within the cavity may be visualized by a user via an inspection port window 512 coupled with the cavity through the side of the casing. The above-described bearing debris collection and inspection port mechanisms may be included downstream of the oil cavity, but upstream of an engine oil pan in the oil circuit. Bearing debris may be captured before it can return to the engine.

In another example, the inspection port may be included in an integrated front end cover of the engine that is open to the oil return channel from the oil cavity of the turbocharger. For example, the oil return channel may be routed from the oil cavity of the turbocharger to an debris collection chamber within the integrated front end cover.

Returning to FIG. 2, exhaust gas may enter through an inlet, such as gas inlet transition region 220, and pass over a nose piece 222. A nozzle ring 224 may include airfoil-shaped vanes arranged circumferentially to form a complete 360° assembly. The nozzle ring may act to optimally direct the exhaust gas to a turbine disc/blade assembly, including blades 226 and a turbine disc 228, coupled to the shaft 206. In some embodiments, the turbine disc and blades may be an integral component, known as a turbine blisk.

The blades may be airfoil-shaped blades extending outwardly from the turbine disc, which rotates about a centerline axis 270 of the turbocharger. An annular shroud 230 is coupled to the casing at a shroud mounting flange 232 and arranged so as to closely surround the blades and thereby define the flowpath boundary for the exhaust stream flowing through the turbine.

The turbine is an axial turbine, as the exhaust flow impels on the turbine blades in an axial direction relative to the center axis of the turbocharger. However, in some embodiments, the turbine may be a radial turbine. Further, the turbocharger is depicted as a single-staged turbocharger, that is, only one turbine and one compressor are present. Multi-staged turbochargers, which include more than one turbine and more than one compressor, are also within the scope of this disclosure.

The shroud includes an internal cooling path (also referred to herein as an internal flow path). FIG. 2 shows an embodiment of an internal flow path 234 of the shroud. The internal flow path is an annular flow path flowing through a middle portion of the shroud around a circumference of the shroud. Further, an inlet 235 to the internal flow path is arranged on an exterior surface of the shroud, exterior to internal components of the turbocharger. For example, as shown in FIG. 2, the inlet to the internal flow path is arranged on an exterior, outboard surface at one portion of the shroud. The inlet does not run around the circumference of the shroud, but is positioned at one end of the turbocharger. In alternate embodiments, the internal flow path may include multiple inlets around a circumference of the exterior, outboard surface of the shroud, or around an entirety of the circumference of the exterior surface. Alternate locations on a surface of the shroud for the inlet to the internal flow path may be located based on application specific parameters. The internal flow path includes an outlet 237. As such, coolant flow (e.g., air from various locations of the vehicle or engine, as described above with reference to FIG. 1), as shown by arrows 236, may enter the shroud at the cooling flow path inlet, flow into the cooling flow path and around an interior circumference of the shroud, and then out the cooling flow path outlet. Depending on the temperature of the fluid flowing through the internal flow path of the shroud, heat may be transferred from the shroud to the circulating fluid or heat may be transferred from the circulating fluid to the shroud. As such, a temperature of the shroud may be controlled based on an amount and/or temperature of the fluid flowing through the internal flow path of the shroud.

FIG. 3 shows the upper-half of a cross-sectional view of the shroud 230 including the internal flow path 234. The view of FIG. 3 is a radial cross-section, where a section has been taken along a plane coincident (axis lying within the plane) with a longitudinal axis of the annular shroud. Further, FIG. 3 shows one embodiment of a design and geometry for a shroud. However, alternate shroud geometries are possible that include a similar internal flow path for flowing coolant through an interior cavity of the shroud and selection of the geometry is made with reference to the specific application.

As shown in FIG. 3, the shroud includes a first region 302, a second region 304, and a third region 306. The first region may be a mounting region configured to couple the shroud to a casing of the turbine, and is positioned distal from the turbine disc (a blade 226 of the turbine disc is illustrated in FIG. 3). A long axis of the first region is generally perpendicular to the longitudinal axis of the shroud, thereby providing an annular flange to mount the shroud. The second region may be a transition region arranged between the first region and the third region. The third region may be a containment region configured to surround a turbine disc. The third region is proximal to the blade of the turbine disc. The third region may be positioned radially outwards from the turbine disc such that debris flying radially outwards from the turbine will hit the shroud. As one example, the first region, second region, and third region may be comprised of an integral piece of material or may be comprised of more than one piece of material. Alternatively or additionally, the shroud may be a single-layered shroud, a multiple-layered shroud, or may have another suitable arrangement.

The internal flow path is positioned in the third region of the shroud where a thickness of the shroud is greatest and where the shroud surrounds the turbine blade. However, alternate positions of the internal flow path along a length of the shroud (from the first region to a tip 320 of the shroud) are possible. Further, the internal flow path is positioned at a centerline 322 of the third region of the shroud. For example, a center of the internal flow path is positioned approximately at the centerline of the third region of the shroud. The internal flow path extends along a portion of the length of the shroud.

The shroud includes a clearance region 318 between an interior radial surface of the shroud and the blades of the turbine disc. The clearance region improves performance of the turbine disc and helps direct the exhaust in a flow path. A tip clearance 316 is defined between the innermost surface (defined in the radial direction) of the shroud and the tip of the turbine blade. Additionally, tighter clearances of this clearance region may also improve performance of the turbine. For example, if the clearance region gets too large, the turbine performance may decrease. Thus, a size of this clearance region may be controlled, as explained herein, to optimize turbine performance.

The shroud may be comprised of a material having a high strength and/or toughness for increasing containment capabilities of the shroud. A suitable material for the shroud may be commercially available NITRONIC 50®. A shroud material of this type should have a higher coefficient of thermal expansion than the material that forms the turbine blades. When the coefficient of thermal expansion of the shroud material is greater than the turbine blade material, the tip clearance during turbocharger operation may increase from a static clearance (defined as the tip clearance when the turbocharger is not operating). Further, turbine blade tip growth and geometry changes to the shroud may occur during turbocharger operation based on turbocharger operating conditions. For example, altitude, turbine speed, pre-turbine temperature, and surging conditions may all influence the tip clearance. As one example, tip clearance increases as turbine speed increases due to increasing thermal, and pressure loads on the turbine components. Increasing centripetal loads on the turbine may decrease the tip clearance since it only acts on the rotating disc and buckets (e.g., shroud is stationary) but the overall tip clearance may still increase due to thermal expansion of the shroud, as explained below.

As the temperature of the shroud increases during turbocharger operation, the shroud may grow and deflects outward in a radial direction and the tip clearance may increase. As the tip clearance increases, turbine efficiency may decrease. However, if tip clearance becomes too small, contact between the blade and shroud may occur, therefore causing degradation of the turbine components.

During turbocharger operation, coolant (e.g., air, water, or the like) may flow through the internal flow path of the shroud to control turbine component temperature in effort to reduce mechanical degradation and increase longevity of the turbine components. This internal shroud cooling to maintain shroud temperatures under upper threshold values for mechanical degradation may reduce shroud growth and increases in tip clearance. To control the shroud temperature to reduce increases in tip clearance due to shroud growth relative to the turbine blade, a flow of coolant may be provided via the internal flow path of the shroud. The amount, flow rate and temperature of the coolant provided to the shroud may be based at least in part on an estimate (or in some instances measurement) of tip clearance, turbocharger speed, charge air pressure, ambient temperature and/or pressure, component material properties, turbocharger efficiency, and/or other turbocharger operating conditions. In this way, as turbine efficiency decreases and/or tip clearance increases, a controller may adjust a flow of coolant through the internal flow path of the shroud in order to increase shroud cooling and reduce the shroud growth (e.g., deflection away from the turbine blade).

FIG. 4 shows a method 400 for adjusting cooling to a turbine shroud of a turbine (such as the turbine 202 and shroud 230 shown in FIGS. 2 and 3). A coolant, such as air from an engine air passage, air from a vehicle air source, cooling water, or some other fluid, may be provided to an internal cooling path (such as internal cooling path 234 shown in FIGS. 2-3) within the turbine shroud. Instructions for carrying out method 400 may be executed by a controller (such as controller 148 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

A method begins at 402 by estimating and/or measuring engine operating conditions. Engine operating conditions may include engine speed and load, engine coolant temperature, turbine inlet air temperature, a temperature of air entering an internal cooling path of a turbine shroud, turbine speed, ambient temperature, barometric pressure, compressor discharge temperature, charge air cooler discharge temperature, pre-turbine pressure, compressor discharge pressure, a position of a turbocharger wastegate valve positioned in a bypass passage around a turbine of the turbocharger, an amount of exhaust flow through the wastegate valve and turbine bypass passage, an amount of exhaust gas recirculation flow (e.g., high pressure EGR flow), or the like.

At 404, the method includes flowing coolant (e.g., cooling air) to an internal flow path of a turbine shroud (e.g., such as the internal flow path 234 of turbine shroud 230 shown in FIGS. 2-3). Thus, the method at 404 includes flowing air through an interior of the turbine shroud. Flowing air to the turbine shroud may include flowing air from one or more of an intake passage downstream of a compressor and upstream of a charge air cooler (e.g., via first coolant path 136 shown in FIG. 1), the intake passage downstream of the charge air cooler and upstream of the engine (e.g., via second coolant path 132 shown in FIG. 1), and/or an on-board vehicle compressor (e.g., such as the on-board locomotive compressor 126 via third coolant path 138 shown in FIG. 1). In one example, air may flow to the internal flow path of the shroud from only one of the above air passages. In another example, a coolant valve (such as valve 140 shown in FIG. 1) may be disposed upstream of the shroud and the controller may adjust a position of the coolant valve to selectively adjust which airflow is provided to the internal flow path of the shroud. In another example, each of the coolant paths fluidly coupled with the internal cooling path may include a valve adjustable via the controller. The controller may adjust the one or more coolant valves at 404 to provide air at a first temperature that maintains the shroud temperature at a first level that reduces mechanical degradation of the turbine components. It should be noted that the first level may be a higher level relative to a lower, second level, as described below with reference to 410. In this way, the first temperature of the coolant may be based on component temperatures of the turbine components.

At 406, the method includes determining turbine efficiency (e.g., turbocharger efficiency) and/or a tip clearance between the turbine blade and turbine shroud (e.g., turbine blade tip clearance) based on engine operating conditions. In one example, the turbocharger efficiency is based on one or more monitored parameters such as barometric pressure, compressor discharge temperature (e.g., temperature of the charge air leaving the compressor), compressor discharge pressure, pre-turbine pressure, compressor inlet temperature, pre-turbine temperature, and/or turbocharger speed (e.g., turbine speed). For example, the controller may estimate the turbocharger efficiency based on one or more of these measured or estimated parameters. In another example, the controller may estimate tip clearance based on one or more monitored parameters such as barometric pressure, compressor discharge temperature, compressor discharge pressure, pre-turbine pressure, and/or turbocharger speed. For example, a look-up table may be stored in a memory of the controller with different tip clearance values as a function of the monitored parameters. The controller may look up a tip clearance value based on one or more of the measured or estimated parameters listed above. In yet another example, a tip clearance probe may be mounted to the turbine shroud and a controller may receive a signal from the tip clearance probe and subsequently determine the current tip clearance.

After determining the turbine blade tip clearance or the turbocharger efficiency, the method continues to 408 to determine whether the turbocharger efficiency is less than a threshold value for turbocharger efficiency and/or if the estimated or measured tip clearance is greater than a threshold tip clearance. The threshold tip clearance may be a desired tip clearance which is based on one or more engine operating conditions. As one example, the desired tip clearance may be based on a position of a wastegate (such as wastegate 123 shown in FIG. 1), an amount of flow or flow rate through the wastegate, and/or an amount of flow rate of HP EGR through a HP EGR passage (e.g., such as HP EGR passage 125 shown in FIG. 1). In this way, the amount of exhaust flow flowing through the turbine (which increases as HP EGR flow and flow through the wastegate decreases) may affect the desired tip clearance.

If one or both of the conditions at 408 are met, the method continues to 410 to provide additional internal cooling to the internal flow path of the turbine shroud by adjusting one or more flow conditions of the coolant supplied to the internal flow path. As one example, at 412, the controller may increase a supply pressure of coolant (from one or more of the coolant sources) to the shroud internal flow path. As another example, at 414, the controller may decrease a supply temperature of the coolant to the shroud internal flow path. Decreasing the supply temperature of coolant may include adjusting one or more coolant valves (such as valve 140 shown in FIG. 1) to change the air source of the coolant. For example, if air for the internal flow path of the shroud is being provided from downstream of the compressor and upstream of the charge air cooler, the method at 414 may include switching the supply of air to come from a position downstream of the charge air cooler and upstream of the engine. In this way, cooler air may be supplied to the internal flow path of the shroud. In this way, the controller may adjust one or more coolant valves at 414 to provide air at a temperature that maintains the shroud temperature at a second level that reduces tip clearance, where the second level is lower than the first level described above at 404. As yet another example, at 416, the controller may increase a supply orifice size of the internal flow path. For example, an orifice (or opening) of the internal flow path may be actively adjusted via an actuator in communication with the controller. As such, the controller may increase the size (e.g., diameter) of the orifice in order to increase the amount of cooling air supplied to the inside of the shroud via the internal flow path.

Returning to 408, if neither of the conditions at 408 are met (e.g., turbocharger efficiency is not less than the associated threshold and the tip clearance is not greater than the associate threshold), the method continues to 418 where the controller determines if there is a low clearance condition. The low clearance condition may include the estimated or measured tip clearance being below a lower tip clearance threshold. The lower tip clearance threshold may be a tip clearance that brings the turbine blade and shroud within a threshold distance of one another that may result in contact between the shroud and blade. If the lower clearance condition is met, the method continues to 420 to provide heated air (or warmer air than what was previously flowing) to the internal flow path of the shroud in order to decrease cooling at the turbine shroud. For example, the controller may change the source of the air provided to the internal flow path via adjusting one or more coolant valves (e.g., such as valve 140 shown in FIG. 1) to provide air at a higher temperature than what was previously being supplied to the internal cooling path. As one example, the controller may change the supply of air for the internal cooling path from a position downstream of the charge air cooler to a position upstream of the charge air cooler and downstream of the compressor. In another example, heater air from another heated air source on board the engine or vehicle may be provided to the internal flow path. In this way, heated air, or air at a higher supply temperature, may be provided to the internal flow path and a temperature of the shroud may be increased. In another example, the method at 420 may include turning off the coolant flow from all air flow sources to the internal flow path of the shroud. For example, if no air source is hotter than a temperature of the shroud (e.g., such that heat may be transferred from the air source to the shroud), then the controller may turn of the coolant so no coolant flows through the internal flow path. As a result of increasing the temperature of the shroud by either flowing hotter air through the internal flow path or turning of the coolant flow to the internal flow path, the shroud may deflect radially outward and the tip clearance may be increased, thereby reducing the chance of turbocharger degradation via contact between the turbine blade and shroud. Alternatively at 418, if the low clearance condition is not present, the method continues to 422 to maintain the current coolant flow to the internal flow path of the turbine shroud. As such, the method then exits.

In this way, by adjusting a flow of airflow (e.g., coolant flow which may be air from different air sources at different temperature) to an internal flow path (e.g., internal cavity) of a turbine shroud, the temperature of the shroud may be controlled. For example, the shroud temperature may be controlled to a higher, first level that reduces mechanical degradation of turbocharger components due to overheating. In another example, the shroud temperature may be further controlled to a lower, second level that reduces the turbine tip clearance to a level that increases turbine efficiency. By adjusting the flow of coolant to the internal flow path of the turbine shroud based on tip clearance and/or turbocharger efficiency, a technical effect of increasing turbocharger efficiency while also preventing contact between the turbine blade and shroud is achieved. Further, by providing coolant to the shroud from one or more engine and vehicle air sources, additional coolant sources are not needed, thereby reducing a number of engine components. Further, providing coolant to the shroud from multiple engine and/or vehicle air sources, the temperature of the coolant and thus the shroud may be adjusted more quickly and accurately, thereby maintaining the tip clearance at a desired clearance level.

As one embodiment, a method for an engine including a turbocharger, comprises: selectively adjusting a flow of coolant from one or more coolant sources through a shroud of a turbine based on a tip clearance between the shroud and a blade of the turbine. In one example, selectively adjusting the flow of coolant includes providing additional internal cooling to the shroud in response to the tip clearance increasing above a first threshold clearance and providing additional internal cooling includes one or more of increasing a supply pressure of the coolant, decreasing a supply temperature of the coolant, or increasing a supply orifice of an inlet to an internal flow path of the shroud flowing the coolant. The method may further comprise providing additional internal cooling to the shroud in response to an efficiency of the turbocharger decreasing below a threshold level, wherein the turbine efficiency is based on one or more of barometric pressure, a temperature of charge air exiting a compressor driven by the turbine, a pressure of the charge air exiting the compressor, a pressure of air entering the turbine, a temperature of air entering the compressor, a temperature of air entering the turbine, or turbine speed. In another example, the tip clearance is measured by a tip clearance probe coupled to the shroud. In yet another example, the tip clearance is estimated based on one or more of barometric pressure, a temperature of charge air exiting a compressor driven by the turbine, a pressure of the charge air exiting the compressor, a pressure of air entering the turbine, a temperature of air entering the compressor, a temperature of air entering the turbine, or turbine speed. Additionally, in one example, the one or more engine air sources includes one or more of charge air from downstream of a compressor driven by the turbine and upstream of a charge air cooler, charge air from downstream of the charge air cooler and upstream of the engine, or air from an additional on-board compressor located on board a vehicle in which the engine is installed. Further, in on example, the shroud includes an internal flow path arranged around a circumference of an interior of the shroud. In another example, selectively adjusting the flow of coolant from one or more engine air sources through the shroud includes adjusting a valve positioned upstream of an internal flow path of the shroud adapted to flow the coolant, where the valve is fluidly coupled to the one or more engine air sources. In yet another example, selectively adjusting the flow of coolant includes providing heated air to decrease cooling of the shroud in response to the tip clearance decreasing below a second threshold clearance. As an example, providing heated air to decrease cooling of the shroud includes adjusting a source from which the coolant is provided from a source at a lower, first temperature to a source at a higher, second temperature.

As another embodiment, a method for an engine, comprises: adjusting a flow of coolant through a turbine shroud of a turbocharger to reduce a temperature of the turbine shroud to a first level; and in response to an efficiency of the turbocharger decreasing below a threshold level, further adjusting the flow of coolant through the turbine shroud to reduce the temperature of the turbine shroud to a second level, lower than the first level. Suitable coolant may be cooling air from one of: an outlet of a compressor driven by the turbine, an outlet of an on-board compressor, or charged intake air from downstream of a charge air cooler. In one example, further adjusting the flow of coolant through the turbine to reduce the temperature of the turbine shroud to the second level includes one or more of increasing a supply pressure of the coolant, decreasing a supply temperature of the coolant, or increasing a supply orifice of an inlet to a coolant path through the turbine shroud. In another example, further adjusting the flow of coolant through the turbine to reduce the temperature of the turbine shroud to the second level includes adjusting a source of the coolant from a first source at a higher temperature to a second source at a lower temperature. Additionally, the first source and the second source may both be air sources from air passages of the engine. The method may additionally or alternatively comprise, in response to a tip clearance between the turbine shroud and a turbine blade increasing above a first threshold level, further adjusting the flow of coolant through the turbine shroud to reduce the temperature of the turbine shroud to the second level. The method may further comprise, in response to the tip clearance decreasing below a second threshold level, smaller than the first threshold level, adjusting the flow of coolant through the turbine shroud to increase the temperature of the turbine shroud.

As yet another embodiment, a system for an engine, comprises: a turbine including a shroud surrounding a turbine blade of the turbine; a compressor driven at least partly by the turbine; a charge air cooler disposed downstream of the compressor; and a controller that can selectively adjust a flow of coolant flow from one or more coolant sources (which may be air sources, in one example) of the engine through the shroud in response to an estimated tip clearance between the turbine blade and shroud. In one example of the system, the shroud includes an internal flow path configured to flow the coolant flow and the system includes a compressor disposed on board a vehicle, such as a locomotive, in which the engine is installed. Additionally, the controller selectively adjust the flow of coolant flow through the internal flow path from one or more of a location downstream of the compressor, a location downstream of the charge air cooler, or a location downstream of the compressor in response to the tip clearance.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine and a turbocharger, comprising:
   determining a tip clearance between a shroud of a turbine of the turbocharger and a blade of the turbine, wherein the tip clearance is determined by a tip clearance probe measuring the tip clearance, the tip clearance probe coupled to the shroud; and
   selectively adjusting a flow of coolant from one or more engine coolant sources through the shroud based at least in part on the tip clearance that is determined.

2. The method of claim 1, wherein selectively adjusting the flow of coolant includes providing additional internal cooling to the shroud in response to the tip clearance increasing above a first threshold clearance value.

3. The method of claim 2, wherein providing additional internal cooling includes one or more of changing a supply pressure of the coolant, changing a supply temperature of the coolant, or changing a flow rate through a supply orifice of an inlet to an internal flow path of the shroud flowing the coolant.

4. A method for an engine and a turbocharger, comprising:
   selectively adjusting a flow of coolant from one or more engine coolant sources through a shroud of a turbine based at least in part on a tip clearance between the shroud and a blade of the turbine; and
   cooling the shroud via providing coolant at least in part in response to a measured change in operating efficiency of the turbocharger decreasing below a threshold level, wherein the efficiency of the turbocharger is measured based on one or more of barometric pressure, a temperature of charge air exiting a compressor driven by the turbine, a pressure of the charge air exiting the compressor, a pressure of air entering the turbine, a temperature of air entering the compressor, a temperature of air entering the turbine, or turbine speed.

5. The method of claim 1, wherein determining the tip clearance further comprises estimating the tip clearance based on one or more of barometric pressure, a temperature of charge air exiting a compressor driven by the turbine, a pressure of the charge air exiting the compressor, a pressure of air entering the turbine, a temperature of air entering the compressor, a temperature of air entering the turbine, or turbine speed.

6. The method of claim 1, wherein one or more engine coolant sources include one or more engine air sources, the one or more engine air sources including one or more of charge air from downstream of a compressor driven by the turbine and upstream of a charge air cooler, charge air from downstream of the charge air cooler and upstream of the engine, or air from an additional on-board compressor located on board a vehicle in which the engine is installed.

7. The method of claim 1, wherein the shroud includes an internal flow path arranged around a circumference of an interior of the shroud.

8. The method of claim 1, wherein selectively adjusting the flow of coolant from one or more engine coolant sources through the shroud includes adjusting a valve positioned upstream of an internal flow path of the shroud adapted to flow the coolant, where the valve is fluidly coupled to the one or more engine coolant sources.

9. The method of claim 1, wherein selectively adjusting the flow of coolant includes providing heated air to decrease cooling of the shroud in response to the tip clearance decreasing below a second threshold clearance.

10. The method of claim 9, wherein providing heated air to decrease cooling of the shroud includes adjusting a source from which the coolant is provided from a source at a lower, first temperature to a source at a higher, second temperature.

11. A method for an engine, comprising:
adjusting a flow of coolant through a turbine shroud of a turbocharger to control a temperature of the turbine shroud to a first level;
measuring an operating efficiency of the turbocharger; and
in at least partial response to the measured operating efficiency of the turbocharger decreasing below a threshold level, further adjusting the flow of coolant through the turbine shroud to reduce the temperature of the turbine shroud to a second level, lower than the first level.

12. The method of claim 11 wherein the coolant is coolant from one of: an outlet of a compressor driven by the turbine, an outlet of an on-board vehicle compressor, or charged intake air from downstream of a charge air cooler.

13. The method of claim 11, wherein further adjusting the flow of coolant through the turbine to reduce the temperature of the turbine shroud to the second level includes one or more of increasing a supply pressure of the coolant, decreasing a supply temperature of the coolant, or increasing a supply orifice of an inlet to a coolant path through the turbine shroud.

14. The method of claim 11, wherein further adjusting the flow of coolant through the turbine to reduce the temperature of the turbine shroud to the second level includes adjusting a source of the coolant from a first source at a higher temperature to a second source at a lower temperature.

15. The method of claim 14, wherein the first source and the second source are both air sources from air passages of the engine.

16. The method of claim 11, further comprising in response to a tip clearance between the turbine shroud and a turbine blade increasing above a first threshold level, further adjusting the flow of coolant through the turbine shroud to reduce the temperature of the turbine shroud to the second level.

17. The method of claim 16, further comprising in response to the tip clearance decreasing below a second threshold level, smaller than the first threshold level, adjusting the flow of coolant through the turbine shroud to increase the temperature of the turbine shroud.

18. A system for an engine, comprising:
a turbine including a shroud surrounding a turbine blade of the turbine;
a tip clearance probe coupled to the shroud, the probe configured to measure a tip clearance between the turbine blade and the shroud;
a compressor driven at least partly by the turbine;
a charge air cooler disposed downstream of the compressor; and
a controller configured to:
selectively adjust a flow of coolant flow from one or more coolant sources of the engine through the shroud in response to the measured tip clearance between the turbine blade and shroud.

19. The system of claim 18, wherein the shroud includes an internal flow path configured to flow the coolant flow, further comprising a vehicle compressor disposed on board a vehicle in which the engine is installed, and wherein the controller is further configured to selectively adjust the flow of coolant flow through the internal flow path from one or more of a location downstream of the compressor, a location downstream of the charge air cooler, or a location downstream of the vehicle compressor in response to the measured tip clearance.

20. The method of claim 11, wherein the operating efficiency of the turbocharger is measured based on one or more of barometric pressure, a temperature of charge air exiting a compressor driven by a turbine of the turbocharger, a pressure of the charge air exiting the compressor, a pressure of air entering the turbine, a temperature of air entering the compressor, a temperature of air entering the turbine, or turbine speed.

* * * * *